United States Patent
Zhong et al.

(10) Patent No.: US 8,634,808 B1
(45) Date of Patent: Jan. 21, 2014

(54) MOBILE DEVICE LOSS PREVENTION

(71) Applicants: Anthony Zhong, Nanjing (CN); Jing Cao, Nanjing (CN); Hunk Shi, Nanjing (CN)

(72) Inventors: Anthony Zhong, Nanjing (CN); Jing Cao, Nanjing (CN); Hunk Shi, Nanjing (CN)

(73) Assignee: Trend Micro Inc., Tokyo (JP)

( * ) Notice: Subject to any disclaimer, the term of this patent is extended or adjusted under 35 U.S.C. 154(b) by 0 days.

(21) Appl. No.: 13/683,899

(22) Filed: Nov. 21, 2012

(51) Int. Cl.
*H04M 1/66* (2006.01)
*G06F 7/04* (2006.01)

(52) U.S. Cl.
USPC .............. 455/411; 340/5.8; 726/17; 726/28

(58) Field of Classification Search
USPC ............ 455/410–411; 379/189; 726/1–36; 709/229; 348/143; 340/5.8
See application file for complete search history.

(56) References Cited

U.S. PATENT DOCUMENTS

| | | | |
|---|---|---|---|
| 2003/0043034 A1* | 3/2003 | Baker | 340/539 |
| 2008/0001703 A1* | 1/2008 | Goto | 340/5.8 |
| 2008/0108299 A1* | 5/2008 | Hullot et al. | 455/3.01 |
| 2011/0141276 A1* | 6/2011 | Borghei | 348/143 |
| 2012/0235790 A1* | 9/2012 | Zhao et al. | 340/5.83 |

* cited by examiner

*Primary Examiner* — Vladimir Magloire
*Assistant Examiner* — Michael Mapa
(74) *Attorney, Agent, or Firm* — Beyer Law Group LLP (57) ABSTRACT

Collected information is analyzed by the mobile device to determine whether the device is displaced from the owner. The mobile device monitors and detects a reduction of ambient light to automatically enter into protection mode without manual activation. If an increase of ambient light and movement of the mobile device are both detected, then the device enters into authentication mode. Various techniques to verify the user's identity may be implemented in authentication mode. The user must correctly match an input key code, button combination, or an image recognition photograph against the stored information according to the method of verification chosen in each respective process. An alarm is activated if the device determines authentication is not received but may be disabled when the user's identity is verified after another authentication attempt.

26 Claims, 5 Drawing Sheets

MOBILE DEVICE LOSS PREVENTION

FIELD OF THE INVENTION

The present invention relates generally to mobile device loss prevention. More specifically, the present invention relates to detecting a mobile device loss with use of sensors.

BACKGROUND OF THE INVENTION

Mobile devices are becoming increasingly more advanced with functions and features that assist the lives of everyday mobile device owners. As more advanced technologies are incorporated into these mobile devices, the costs of these devices continue to increase. In addition, the functions and features of these devices play a pivotal role in the owners' lives in that sensitive and irreplaceable personal data are now commonly stored onto their devices. Sensitive personal data such as addresses, financial information, and other private data can be detrimental to an owner if lost or stolen. For example, thieves who are able to access sensitive data may steal one's identity or know when no one is home based on the schedule from a calendar. Further, personal information may be obtained from the lost or stolen devices' contacts as the device is unaware that it is revealing sensitive data to a thief or someone who is not an owner of the device. Irreplaceable personal data oftentimes consists of valuable personal photographs or contact information that have not yet been transferred or stored elsewhere.

Anti-loss protection applications in the current market include a mobile device tracker, and methods to lock the device, synchronize data remotely, and destroy all data. However, these applications are unable to detect and prevent loss or theft. Detecting a lost or stolen mobile device as quickly as possible will aid in recovery and reduce or avoid any harm. Currently, owners may only activate anti-theft protection applications after theft occurs but, by then, significant time could elapse causing irreparable harm. Preventing the loss of sensitive data and irreplaceable data, and the exorbitant replacement costs of a mobile device are issues that should be addressed.

Therefore, what is needed is an improved method for providing security to mobile devices at the early stages of a lost device or theft to prevent loss of sensitive data, loss of irreplaceable data, and to avoid expensive mobile device replacement costs.

SUMMARY OF THE INVENTION

To achieve the foregoing, and in accordance with the purpose of the present invention, a mobile device loss prevention method is disclosed to protect a device from loss or theft.

Mobile device loss prevention applications typically activate protection methods to prevent access to the mobile device to assist in recovery, but only after the owner manually initiates the protection method remotely. By, contrast, the present invention automatically detects loss of theft immediately. The present invention protects a mobile device from loss by checking for a reduction in ambient light before entering into protection mode. Once the protection mode is activated, the device will prompt the user to authenticate their identity if the device detects both an increase in ambient light and device movement. The authentication mode will preclude unauthorized access and trigger an alarm if one of the various methods of identity verification is not provided by the user. The alarm will trigger automatically to aid in recovering the mobile device without any further delay. By contrast, other mobile device loss prevention applications must be activated by the user manually in order to thwart unauthorized use and prevent loss. Further, the user of the present invention has the capability to attempt to authenticate their identity again and disable the alarm if the alarm sounds.

In one embodiment of protecting a mobile device, a reduction in ambient light is detected so that the device enters into protection mode to prevent loss. The mobile device will enter authentication mode to verify the user's identity if an increase of ambient light and movement of the device is detected while in protection mode. If authentication mode is triggered, then the user is prompted to input some type of authentication. An alarm will generate on the mobile device if the input authentication does not match authentication data stored on the device.

In an alternative embodiment, the method to protect a mobile device involves a detection of a reduction in ambient light before entering into protection mode. If the device detects both an increase in ambient light and movement of the device in protection mode, then the device will enter authentication mode. A button combination entered on the mobile device must match a stored button combination to authenticate the user; otherwise, an alert will be generated.

A third embodiment includes a method of protecting a mobile device by detecting a reduction in ambient light which causes the device to enter into protection mode. The device will initiate authentication mode when movement of the device and an increase in ambient light is detected while in protection mode. An alert is triggered if a recognition photograph that is taken by the mobile device does not match against a stored photograph to identify the user in authentication mode.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Loss prevention of a mobile device uses sensors of the device, which may be the light sensor and accelerometer, to detect environmental change. A loss may be any type of occurrence where the rightful owner loses possession of the device (such as by theft, dropping the device, losing the device, misplacing the device, or any other situation where the owner does not have the device). Other types of mobile devices (such as a mobile telephone, tablet computer, laptop computer, or any other mobile device) containing these sensors also possess the ability to prevent loss as well. If both sensors are triggered and authentication is not received, an alert is generated to establish an occurrence of loss of the device. The alert, however, can be disabled once authentication is received.

Figure 1:
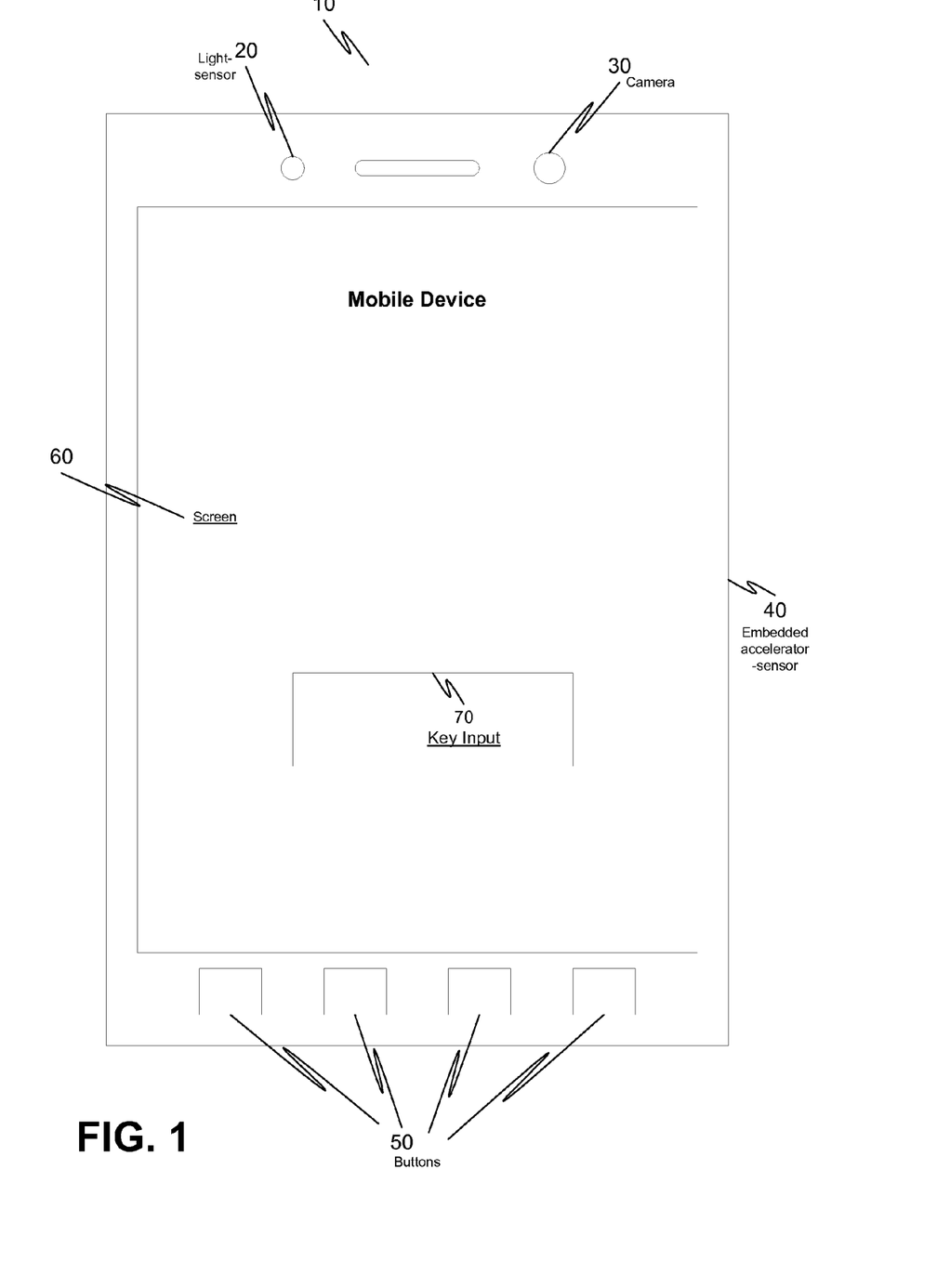
FIG. 1 is a block diagram of a mobile device (such as a mobile telephone, tablet, or any other mobile device) that contains a variety of sensors.

FIG. 1 illustrates a block diagram of a mobile device, such as a mobile telephone, tablet, or any other mobile device, containing a variety of sensors. A mobile device 10 is shown as having a light sensor 20, a camera 30, an accelerometer 40, buttons 50, screen 60, and key input region 70, as well as other known features.

Light sensor 20 may be any suitable sensor on the mobile device used to detect a light intensity or changes in light intensity. The sensor may be a dedicated light sensor, may be integrated with a camera, or other. In one embodiment, light sensor 20 is arranged to detect a reduction in ambient light in order to enter into protection mode, and can also detect an increase in ambient light in order to enter into an authentication mode.

Accelerometer 40 is any suitable sensor used to detect acceleration or movement of the mobile device. For example, the sensor may also be a gyroscope which can detect the movement of the mobile device as well.

In one embodiment, the accelerometer detects movement in order to enter into an authentication mode. The mobile device is also arranged to enter into an alarm mode if authentication is not received using any of the variety of sensors or inputs. Once in alarm mode, an alert can be generated. The alert, however, can be disabled if authentication is later received by matching the stored authentication with any received type of authentication.

Buttons 50 are known in the art and are any of a variety of physical buttons present on the mobile device (such as on its face or side) that include dedicated characters or symbols or are so-called "soft keys" that may be used for different purposes. The screen 60 of the mobile device may be simply a display screen or may also be a touchscreen that allows for input directly on the screen itself. With a touchscreen, key input region 70 may be used by the user to enter characters, symbols, or numbers as is known in the art.

The device may also include a microphone and associated hardware and voice or speech recognition software used to detect a spoken utterance, word or phrase. The device is able to recognize the user's voice or a spoken word or phrase in order to authenticate the user or to disable the alarm.

Protection Mode

Figure 2A:
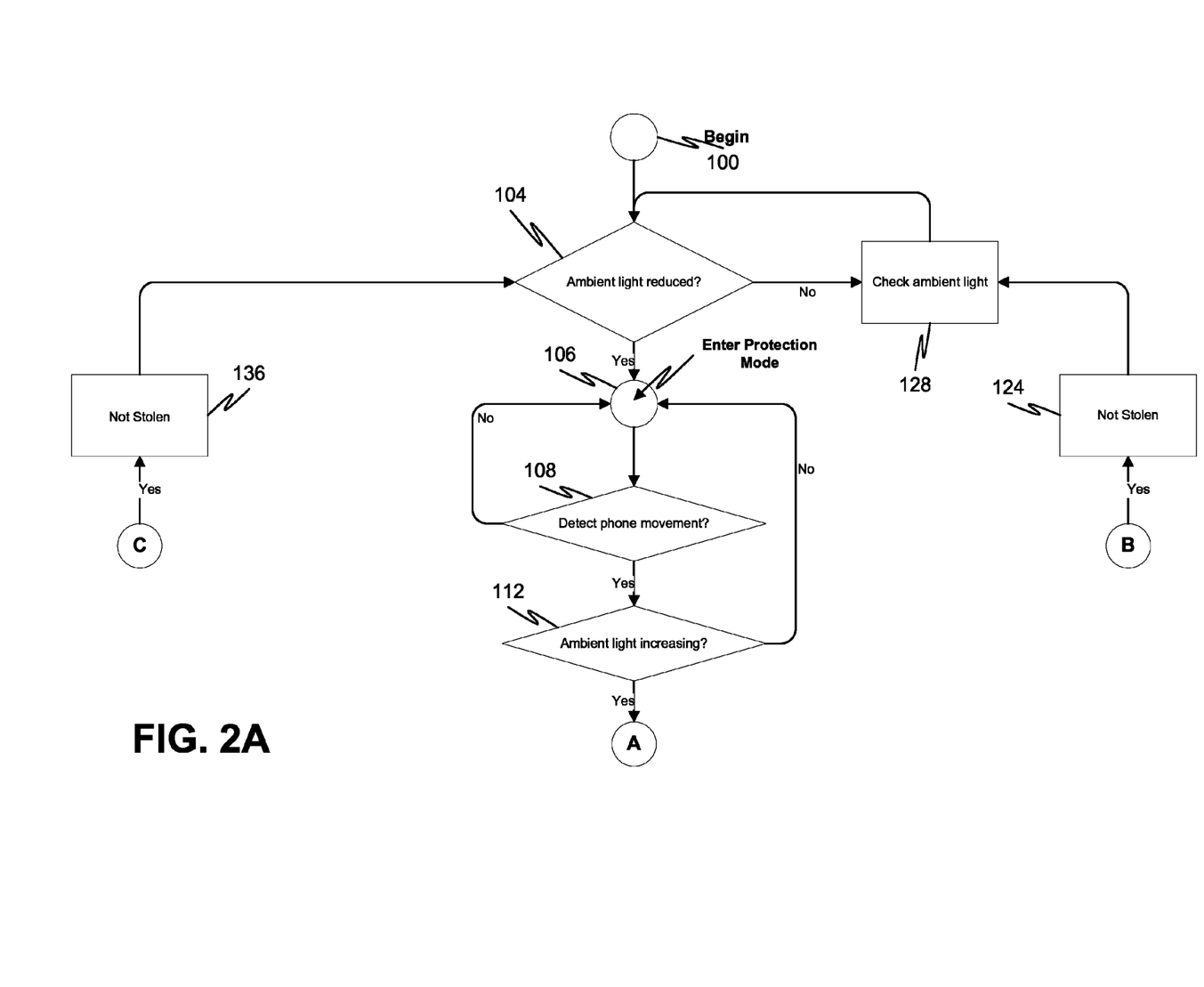
FIG. 2A is a flow diagram describing a process by which a mobile device enters into protection mode.

FIG. 2A is a flow diagram describing a process by which a mobile device enters protection mode. For ease of explanation we will refer to the embodiment in which a mobile device is stolen, however, the below is easily applicable for a mobile device that is also lost, dropped, or misplaced. At step 100, the method begins and the mobile device begins to detect ambient light reduction before entering into a protection mode. As shown in FIG. 1, in one embodiment and as described above, light sensor 20 operates to detect ambient light reduction and ambient light increase. At step 104, a light sensor 20 detects a reduction in ambient light in order to enter into protection mode. Reduction in light may indicate that the device has been placed into a purse, pocket, backpack, bag, or even upside down on a table. Thus a user may choose to protect a device simply by placing the light sensor face down.

No absolute value of a change in Lux is required to indicate that the device has been placed inside something; determining that a light change within an interval has occurred may be enough. For example, the change in Lux may be determined as follows. The light Lux value may be checked every 1 second, the Lux value is recorded a second before as "Luxold," and the Lux value recorded currently as "Luxnew." If Luxold>Luxnew and ((Luxold−Luxnew)/Luxnew)>25, then it will be determined that the device has been put into something or placed face down. If Luxold<Luxnew and ((Luxnew−Luxold)/Luxold)>25, then it will be determined that the device has been taken out of something or lifted from a table.

However, if ambient light is determined to not be reduced, then ambient light will be reevaluated in step 128 and control will return to detect reduced ambient light in step 104 with a light sensor 20.

If a reduction in ambient light is consistent with the device being put away for safe-keeping or being set down, then in step 106 the device enters into a protection mode. While in this mode, the device is sensitive to theft and the mobile device will prompt the user to authenticate their identity if the device determines theft possibly occurring after detecting both phone movement and an increase in ambient light. If the device is in protection mode, the device will proceed to step 200 when an accelerometer 40 detects phone movement 108 with an acceleration of more than about 0.5 g (or, any movement consistent with the device being removed by hand from a dark storage location such as a pocket, purse, etc.) and a light sensor 20 detects an increase in ambient light 112 (consistent with the device being moved from a storage location into daylight, a lit room, the relative dark of night, etc.) with a change in Lux as described above according to one embodiment.

Other sensors (such as the gyroscope or the accelerometer) may be used to detect a dropped telephone. For example, if the telephone moves suddenly at an acceleration of greater than about 9 m/s$^2$ and then its movement is steady (e.g., it moves less than about 0.5 m/s$^2$) for longer than about 2 seconds, it may be determined that the telephone has been dropped from a pocket and considered lost. This movement and an increase in light will also cause the device to enter into authentication mode.

Assume authentication is received by a camera 30, then in one embodiment, it is determined that the device is not stolen in step 124. As mentioned above, once the device is determined not stolen it will check for ambient light and return to detect reduced ambient light in step 104 with a light sensor 20.

Assume authentication is received by buttons 50, a screen 60, or a key input 70, then it is determined that the device is not stolen in step 136. The device will then attempt to detect reduced ambient light with a light sensor 20 before possibly entering into protection mode again.

Authentication Mode

Figure 2B:
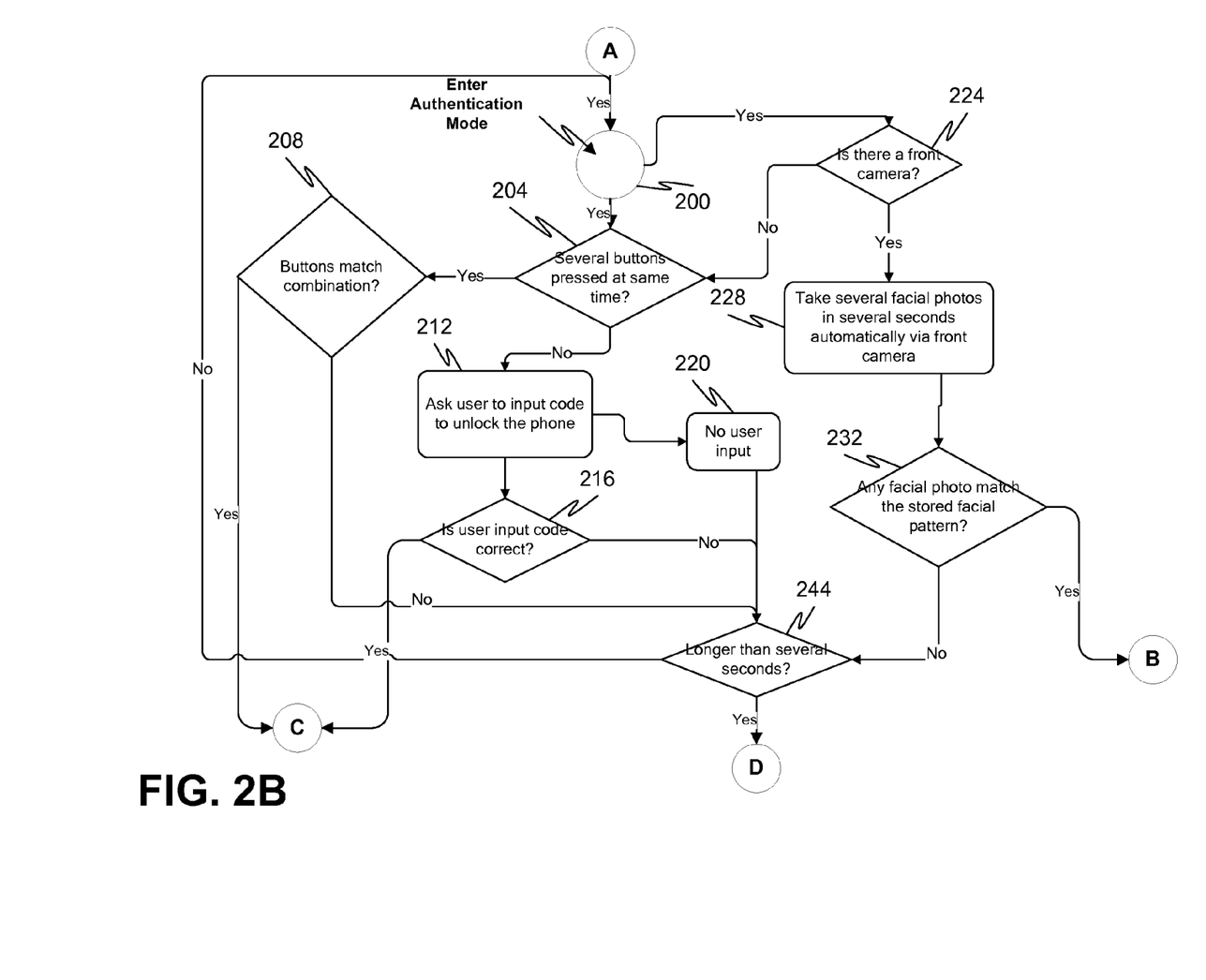
FIG. 2B is a flow diagram describing one embodiment when a mobile device is in authentication mode.

FIG. 2B is a flow diagram describing one embodiment in which a mobile device is in authentication mode. Authentication mode is entered as described above if both a phone movement threshold and an ambient light threshold are crossed, indicating that the phone may have been stolen, dropped, lost or misplaced.

In step 200, authentication mode will begin to verify identification received from the user by various methods, in order to determine if the user's identity matches the stored user authentication. Various techniques to authenticate the rightful owner of the mobile device may be used including image comparison, voice or speech recognition, password comparison, key input comparison, etc. As is known in the art, storing authentication information by the user on his or her mobile device is a common practice. When securing a mobile device before loss, a user may store an image of his or her face, a voice file of a spoken word or phrase, a password, or combination of keys within the mobile device for later authentication. Although only three of these authentication techniques are shown in FIG. 2B, one of skill in the art will appreciate that other authentication techniques may be implemented within the scope of the present invention in order to authenticate the user to the mobile device.

The user of the mobile device may explicitly choose a setting indicating that only one authentication technique shall be used, or a default setting of the device may indicate a particular technique, or the user may implicitly choose a technique by performing one of the below authentication techniques when necessary.

Upon entering authentication mode in step 200, the mobile device may optionally indicate to the user that authentication mode has been entered and that authentication is now necessary before an alarm sounds. For example, upon entering authentication mode the device may display a flashing light, sound a warning tone, or vibrate in a particular pattern. Other techniques for signaling to the user that authentication mode has been entered may be used.

In one embodiment, the mobile device may use the simultaneous (or substantially simultaneous) pressing of buttons to perform authentication. As previously mentioned, the user has beforehand stored the correct combination of buttons needed for authentication within persistent storage of the mobile device. If the device detects multiple physical buttons 50 being pressed in any combination simultaneously in step 204, then the process will proceed to step 208. Or, if the multiple physical buttons are pressed more or less simultaneously the input button combination will also be accepted. The advantage is that the user is allowed to press, for example, two or three buttons at the same time in order to quickly perform authentication. It is not necessary to press buttons sequentially. Requiring the buttons to be pressed simultaneously or substantially simultaneously prevents authentication from happening inadvertently.

If the device determines that the combination of pressed buttons 50 matches the stored combination in step 208, then authentication will be received to identify the user, any indication of authentication mode will be terminated and no alarm will sound. The device will then determine that it is not stolen and proceed to step 136 in FIG. 2A as mentioned above. The device will again attempt to detect a reduction of ambient light in step 104 with a light sensor 20 before entering protection mode again.

If, however, if in step 208 the combination of buttons pressed do not match the previously stored combination, then control moves to step 244. The user will have a predetermined number of seconds (on the order of 10 seconds) in order to press the correct button combination before alarm mode is entered. Alternatively, the user may be given a certain number of tries to enter the correct button combination before alarm mode is entered. If the correct combination is entered, even if a previously incorrect combination was entered, then control moves to step 136. If the predetermined time elapses or if the number of tries are exceeded then alarm mode is entered.

In another authentication embodiment, entry of the correct code is used to perform authentication. In this embodiment, the user will have previously stored the correct code or password in persistent storage of the mobile device. This embodiment may be used immediately after entering authentication mode or after the determination in step 204.

Accordingly, if the device determines that there are no buttons 50 pressed in step 204, then the user will be asked on the screen 60 to input the code in step 212 by using the key input region 70. Or, the user may use any of the alphanumeric keys on a keyboard of the mobile device in order to enter the code or password.

In step 216, the device will determine whether the key input 70 (or the keys pressed) matches the stored key input code to authenticate the user and indicate the device is not stolen. If so, then any signaling of authentication mode terminates and control moves to step 136 as stated above in FIG. 2A. If the key input code is incorrectly entered in step 216 and the elapsed time exceeds the user's predefined time limit to perform authentication (or the number of tries to input a correct code is exceeded) then in step 244 the device will determine that a theft has occurred and will enter into alarm mode in step 300 of FIG. 2C.

Figure 2C:
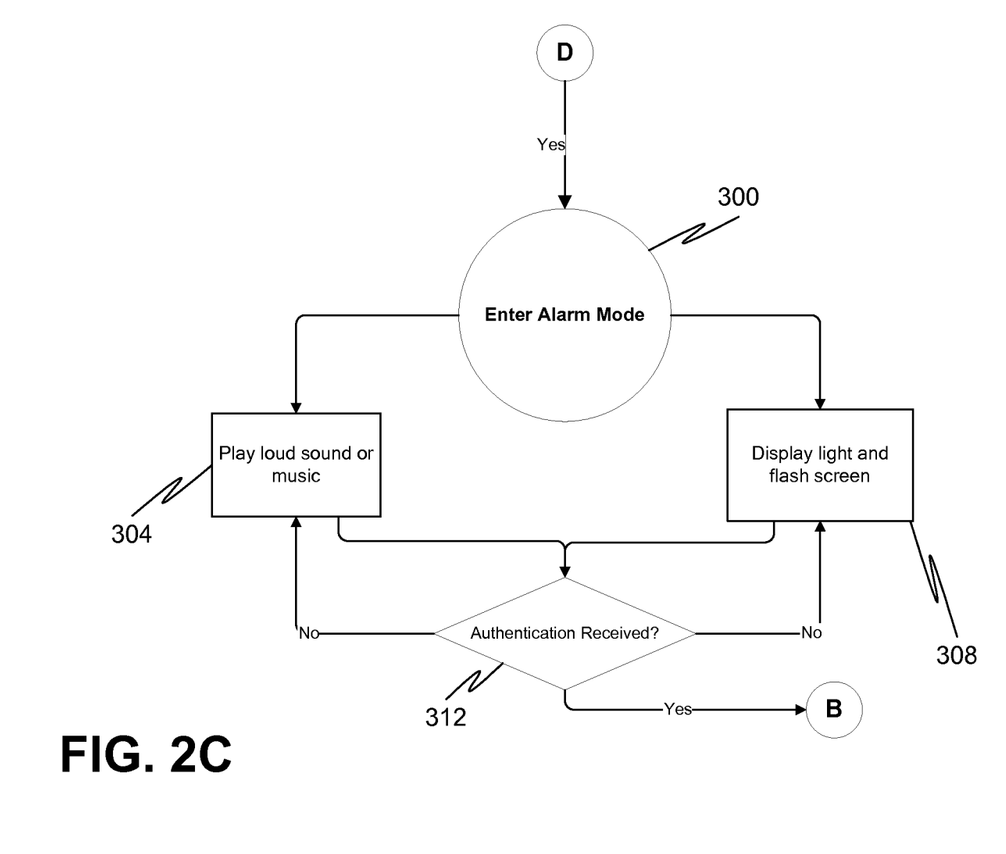
FIG. 2C is a flow diagram describing one technique when a mobile device is in alarm mode.

If the device requests key input 70 in step 212, but the user did not input anything in step 220 before the predefined time limit set in step 224, then the device will enter into alarm mode in step 300 of FIG. 2C. In fact, for any of these authentication techniques, and for any entry into authentication mode, if no user input has been detected after a certain period of time then the alarm mode will be entered.

In another embodiment, image recognition is used to perform authentication based upon a previously stored image of the user's face or other image. This embodiment may begin immediately upon entry into authentication mode in step 200 or may be entered via step 224.

In step 224, for example, if there is no detection of a camera, then the device may use another authentication technique and will attempt to detect if buttons 50 are pressed simultaneously in step 204. However, if the device detects there is a camera present (such as a front-facing or rear-facing camera) within the mobile device in step 224, then the device will instruct the user (on screen or audibly) to position the device towards the user's face and take several facial photographs by using the camera 30 in step 228. Of course, any number of photographs may be taken including a single photograph. Alternatively, the user may take a photograph of any other object or view that is known to match the previously stored image. For example, the user may have previously stored an image of his or her outstretched left hand. Accordingly, in step 228 the user would then snap a photograph of the palm of his or her left hand to perform authentication.

If any of the facial (or other image) photographs match the stored facial pattern on the device in step 232, then the device will determine it is not stolen and control will move to step 124 in FIG. 2A. In addition, any signaling of authentication mode will end.

However, if any of the facial photographs do not match the stored facial pattern in step 232 and time elapses beyond the user's predefined time period for authentication in step 244, then the device will enter into alarm mode in step 300 of FIG. 2C. The user may also be allowed a certain number of tries to snap photographs and have them matched before alarm mode is entered. And, as mentioned, the matching in step 232 may be between the stored image and any other object (other than his or her face) chosen by the user.

In yet another embodiment, voice recognition is used to perform authentication. In this embodiment, the user has previously recorded and stored in persistent storage of the mobile device a word or phrase used for authentication.

Accordingly, the user may speak the appropriate word or phrase into a microphone of the mobile device in order to generate a voice pattern as is known in the art. If the spoken voice pattern matches the stored voice pattern then the device will receive authentication. The device will determine that it is not stolen in step 124 and again check for a reduction in ambient light before proceeding to enter into protection mode in FIG. 2A. But, the device will enter into alarm mode in step 300 if the voice patterns do not match.

Alarm Mode

FIG. 2C is a flow diagram describing one technique in which a mobile device is in alarm mode. The device enters alarm mode in step 300 if, for example, correct authentication has not been entered or if no data has been entered within a predetermined time.

While the device is in alarm mode; the device may play any audio (such as sound or music) in step 304, display a light or flash the screen in step 308, vibrate, or generate any other similar alert. An alarm from the device will draw attention in an attempt to notify anyone nearby that the device has been stolen.

In one embodiment, the device will sound its alarm as set by the user until any authentication is received in step 312 by any of the methods described above in FIG. 2B. If authentication is received in step 312, then the device will determine it is not stolen, the alarm will cease and control will move to step 124. If no authentication is received, then the alarm (sounds, lights or vibration) will continue.

In another embodiment, alternative to the above or in addition to, is to have the mobile device send an SMS message (such as a text message) or an e-mail message to a predefined telephone number or e-mail address in order to update its geographic location (e.g., the coordinates of latitude and longitude), or to deliver an alarm message.

Computer System Embodiment

Figure 3A:
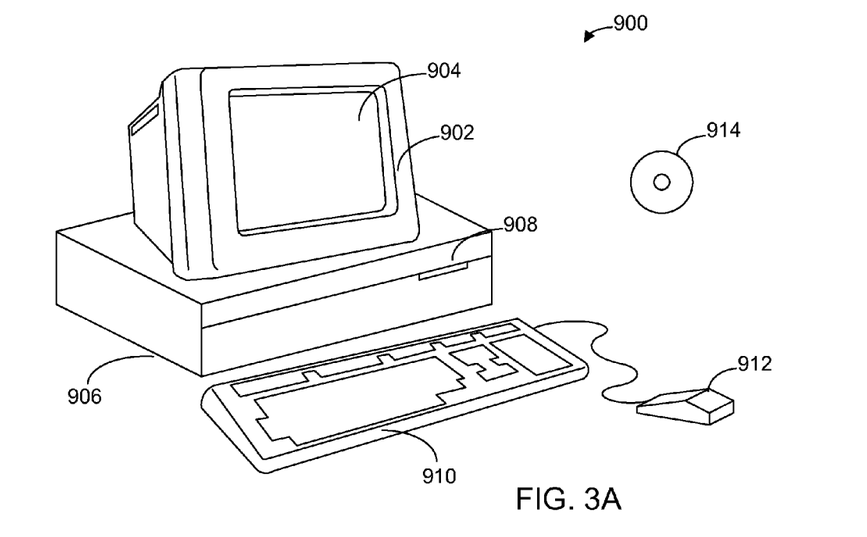
FIGS. 3A and 3B illustrate a computer system suitable for implementing embodiments of the present invention.
Figure 3B:
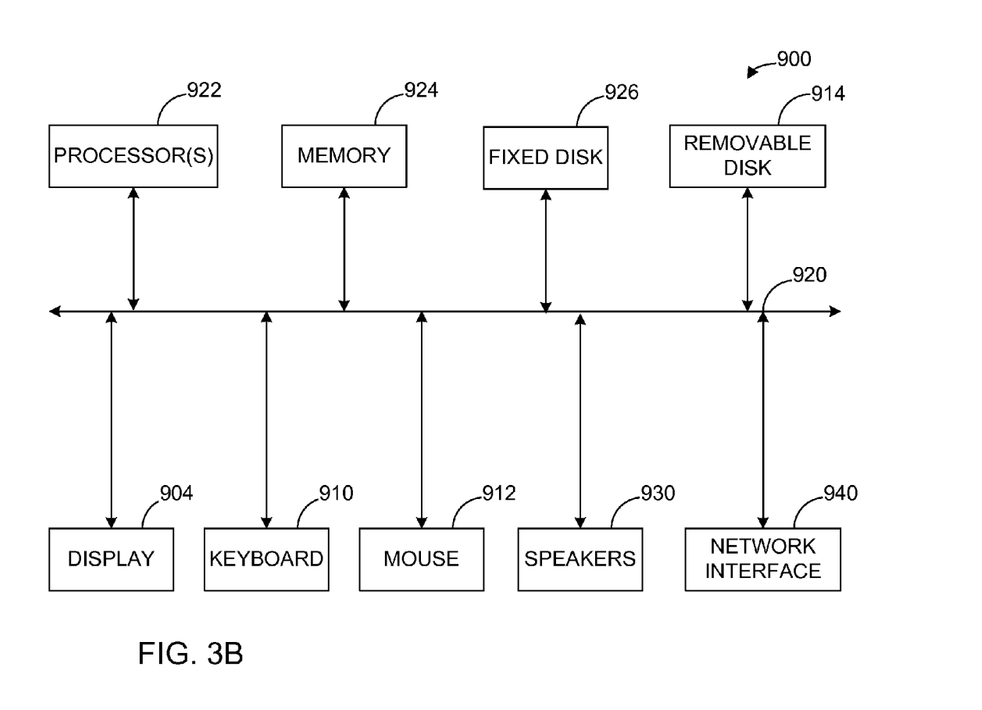

FIGS. 3A and 3B illustrate a computer system 900 suitable for implementing embodiments of the present invention. FIG. 3A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 3B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of protecting a mobile device, said method comprising:
    detecting a reduction in ambient light causing said mobile device to enter into a protection mode;
    while in said protection mode, detecting movement of said mobile device indicating that said mobile device has been dropped and detecting an increase in ambient light causing said mobile device to enter into an authentication mode;
    while in said authentication mode, requesting authentication on said mobile device;
    matching an authentication input on said mobile device against a stored authentication data of said mobile device; and
    generating, while in said authentication mode, an alert on said mobile device that draws attention to said mobile device when it is determined that said authentication input does not match said stored authentication data.

2. The method as recited in claim 1 further comprising:
    receiving said authentication input from a user of said mobile device, wherein said authentication input is a key code or a voice input.

3. The method as recited in claim 1 further comprising:
    after generating said alert, receiving a second authentication input on said mobile device; and
    disabling said alert when it is determined that said second authentication input does match said stored authentication data.

4. The method as recited in claim 1 further comprising:
    entering into said authentication mode only when said detected movement and said detected increase in ambient light occur substantially simultaneously.

5. The method as recited in claim 1 further comprising:
entering into said protection mode only when said detected decrease in ambient light occurs within less than about 3 seconds.

6. The method as recited in claim 4 further comprising:
entering into said authentication mode only when said detected movement is an acceleration value of greater than about 0.5 meters/second$^2$.

7. The method as recited in claim 1 wherein said alert on said mobile device is audio, a display of light, a flashing screen, or a vibration.

8. The method as recited in claim 1 wherein generating an alert further comprises:
sending a message to a predefined address to deliver a geographic location of said mobile device.

9. A method of protecting a mobile device, said method comprising:
detecting a reduction in ambient light causing said mobile device to enter into a protection mode;
while in said protection mode, detecting movement of said mobile device indicating that said mobile device has been dropped and detecting an increase in ambient light causing said mobile device to enter into an authentication mode;
while in said authentication mode, matching an input button combination on said mobile device against a stored button combination; and
generating, while in said authentication mode, an alert on said mobile device that draws attention to said mobile device when it is determined that said button combination does not match said stored button combination.

10. The method as recited in claim 9 further comprising:
generating said alert within a predetermined number of seconds after entering said authentication mode.

11. The method as recited in claim 9 further comprising:
after generating said alert, receiving a second button combination on said mobile device; and
disabling said alert when it is determined that said second button combination does match said stored button combination.

12. The method as recited in claim 9 further comprising:
while in said authentication mode, requesting entry of said input button combination.

13. The method as recited in claim 9 further comprising:
entering into said authentication mode only when said detected movement and said detected increase in ambient light occur substantially simultaneously.

14. The method as recited in claim 9 further comprising:
entering into said protection mode only when said detected decrease in ambient light occurs within less than about 3 seconds.

15. The method as recited in claim 9 further comprising:
entering into said authentication mode only when said detected movement is an acceleration value of greater than about 0.5 meters/second$^2$.

16. The method as recited in claim 9 further comprising:
accepting said input button combination only when buttons of said input button combination are pressed substantially simultaneously.

17. The method as recited in claim 9 wherein said alert on said mobile device is audio, a display of light, a flashing screen, or a vibration.

18. The method as recited in claim 9 wherein generating an alert further comprises:
sending a message to a predefined address to deliver a geographic location of said mobile device.

19. A method of protecting a mobile device, said method comprising:
detecting a reduction in ambient light causing said mobile device to enter into a protection mode;
while in said protection mode, detecting movement of said mobile device indicating that said mobile device has been dropped and detecting an increase in ambient light causing said mobile device to enter into an authentication mode;
while in said authentication mode, said mobile device requesting an input photograph;
matching said input photograph on said mobile device against a stored photograph; and
generating, while in said authentication mode, an alert on said mobile device that draws attention to said mobile device when it is determined that said input photograph does not match said stored input photograph.

20. The method as recited in claim 19 further comprising:
generating said alert within a predetermined number of seconds after entering said authentication mode.

21. The method as recited in claim 19 further comprising:
after generating said alert, receiving a second input photograph on said mobile device; and
disabling said alert when it is determined that said second input photograph does match said stored photograph.

22. The method as recited in claim 19 wherein said detecting is caused by said mobile device being placed onto a surface such that a light sensor of said device is face down.

23. The method as recited in claim 19 wherein said input photograph is a photograph of a face of a user of said mobile device.

24. The method as recited in claim 19 further comprising:
while in said authentication mode, said mobile device taking numerous input photographs of a single image; and
attempting to match one of said numerous input photographs against said stored photograph.

25. The method as recited in claim 19 wherein said alert on said mobile device is audio, a display of light, a flashing screen, or a vibration.

26. The method as recited in claim 19 wherein generating an alert further comprises:
sending a message to a predefined address to deliver a geographic location of said mobile device.

* * * * *